United States Patent
Kato

(10) Patent No.: US 6,439,551 B1
(45) Date of Patent: Aug. 27, 2002

(54) VARIABLE SPRING CONSTANT TYPE DAMPER FILLED WITH VISCOUS FLUID

(75) Inventor: Masatsugu Kato, Tokyo (JP)

(73) Assignee: Polymatech Co., Ltd. (JP)

( * ) Notice: Subject to any disclaimer, the term of this patent is extended or adjusted under 35 U.S.C. 154(b) by 0 days.

(21) Appl. No.: 09/629,811

(22) Filed: Jul. 31, 2000

(30) Foreign Application Priority Data

Aug. 10, 1999 (JP) .............................. 11-226026
Mar. 27, 2000 (JP) ....................... 2000-086476

(51) Int. Cl.[7] .................................................. F16F 9/00
(52) U.S. Cl. .......................................... 267/113; 267/35
(58) Field of Search .......................... 267/113, 35, 136, 267/34, 152, 153; 248/562, 577, 619, 621, 631, 636, 637

(56) References Cited

U.S. PATENT DOCUMENTS 5,379,990 A * 1/1995 Ando et al. ..................... 267/34
5,595,373 A * 1/1997 Ikeda .......................... 267/140.12
5,624,104 A * 4/1997 Hukuda et al. ................ 267/34

FOREIGN PATENT DOCUMENTS

JP 363388739 A * 12/1987
JP 3-84240 A * 4/1991

* cited by examiner

Primary Examiner—Pam Rodriguez
(74) Attorney, Agent, or Firm—McGlew and Tuttle, P.C.

(57) ABSTRACT

A variable spring constant type damper filed with visco fluid which has a great damping effect over a wide frequency band from a low frequency band to a high frequency band and to suppress a resonance magnification at a resonance frequency of a supported body. It is such constituted that the changes are given to a flexible portion (9) made of an elastic body like rubber connecting the flexible portion (9) and a cylindrical portion (8), whereby a spring constant is allowed to depend upon an amplitude.

10 Claims, 8 Drawing Sheets

(a)

(b)

(c)

VARIABLE SPRING CONSTANT TYPE DAMPER FILLED WITH VISCOUS FLUID

FIELD OF TEE INVENTION

This invention relates to a variable spring constant type damper filled with viscous fluid which is a vibration isolator for damping external vibration in acoustic instruments and information instruments using an optical disk or the like.

BACKGROUND OF THE INVENTION

The viscous fluid sealed-type damper damps an external vibration transmitted to a supported body 10 through viscous flow resistance. A stirring portion 3 accepting a shaft 4 is installed on the supported body 10 and oscillates in a viscous fluid 2 in a cylindrical container 1 with a flexible portion 9 made of an elastic body like rubber as is illustrated in FIG. 12.

External vibration can act on acoustic and information instruments using an optical disk or the like, at a frequency and/or an acceleration from small to large, and an impact action. A vibration effect is adjusted by changing the viscosity of the fluid in the viscous fluid sealed-type damper and the hardness of the elastic body like rubber of the supported body, for various vibrations with consideration of weight and balance of the supported body.

The apparent dynamic spring becomes high when sealing the high-viscosity fluid in the case of adjusting a vibration-isolating effect by the viscosity of the fluid, and its amplitude can be reduced by a high resonance frequency and a high damping force. However, the resonance frequency and the damping force are high for a high frequency of 100 Hz or more, whereby a reduction effect of a vibration transmissibility is low, that is to say, the vibration-isolating effect is reduced.

In contrast with this, since a resonance magnification of the supported body becomes high at the vicinity of the resonance frequency (in particular, the vicinity of the low frequency of 10 to 20 Hz) of the supported body when sealing the low viscosity fluid, the amplitude of the supported body becomes large, and a sound divergence of the disk and malfunctions tend to occur at the vicinity of this frequency because of an impact due to a collision of the supported body with a chassis for supporting a disk and an impact due to a collision of the stirring portion with the container or a cap, whereby it has been difficult to obtain the viscous fluid sealed-type damper having a great damping effect over a wide frequency band from a low frequency band to a high frequency band in adjustment of the viscosity of the fluid, and suppressing the resonance magnification at the resonance frequency of the supported body.

Moreover, adjusting the vibration isolating effect by changing the hardness of the rubber of the flexible portion of the elastic body like rubber is very difficult in the fine adjustment, and molding failures such as a weld are caused since a flowability of the material is changed.

SUMMARY AND OBJECTS OF THE INVENTION

This invention is devised in order to solve the problems described above, and provides a variable spring constant type damper filled with viscous fluid constituted to allow the spring constant to depend upon the amplitude by giving changes to the wall thickness of the flexible portion of the damper. Since a thin walled portion oscillates mainly when the amplitude is relatively small, only the spring constant of the thin-walled portion exerts an influence upon the spring constant of the entire damper. Since a thick-walled portion oscillates when the amplitude is relatively large, the spring constant of the thick-walled portion exerts a influence upon the spring constant of the entire damper. Therefore, since the spring constant is small in a high-frequency band with small amplitude, the vibration transmissibility can be lower, and the spring constant is large in a low-frequency band large in amplitude, whereby a resonance magnification can be lower.

Moreover, the variable spring constant type damper filled with viscous fluid is provided where the flexible portion is not broken in practical use, which is large in securing strength between the flexible portion and the cylindrical portion, and has high reliability.

Namely, this invention provides a variable spring constant type damper filled with viscous fluid in which the viscous fluid is sealed by the container. The container is constituted by the stirring portion, the cylindrical portion and the flexible portion made of the elastic body like rubber connecting both the siring and cylindrical portions and the cap. The vibration damping is performed with the viscous resistance caused by the traveling of the stirring portion in the viscous fluid in response to the external vibration in which the wall thickness of the flexible portion is varied.

Furthermore, this invention provides a variable spring constant type damper filled with viscous fluid in which the changes of the wall thickness of the flexible portion are formed so as to vary between a thick wall thickness or thin wall thickness toward the cylindrical portion from the stirring portion successively or in stages.

Furthermore, this invention provides a variable spring constant type damper filled with viscous fluid in which the wall thickness of the flexible portion has a step toward the cylindrical portion and its change is formed such that the thickness can be switched.

Furthermore, this invention provides a variable spring constant type damper filled with viscous fluid wherein the ratio of the thin wall thickness versus the thick wall thickness of the flexible portion is 1.0:1.1 to 1.0:5.0.

Moreover, the wall thickness of the flexible portion is formed so as to become thin toward the central portion from the periphery of the connection of the stirring portion and the cylindrical portion successively or in stages.

Furthermore, the flexible portion is formed such that the periphery of the connection of the stirring portion and the cylindrical portion has the same wall thickness as that.

Moreover, the wall thickness of the flexible portion is formed so as to form the thin-walled portion and the thick-walled portion in the circumferential direction toward the cylindrical portion from the stirring portion radially alternately.

Furthermore, in one which the thin-walled portion and the thick-walled portion are formed radially, the ratio of the thin-wall thickness versus the thick wall thickness of the flexible portion is set at 1.0:1.1 to 1.0:5.0.

Although the ratio of the thin wall thickness versus the thick-wall thickness of the flexible portion according to the invention depends upon the size of the damper and the strength of the elastic body like rubber or the like, it is preferably within the range of 1.0:1.1–1.0:5.0. The change in the thickness does not appear on the change in the spring constant as the damper, when the wall thickness of the thick walled portion with respective to the wall thickness of 1.0 of the thin-walled portion is smaller than 1.1, on the one hand, the difference in tensile stress strength of the thin-walled portion and the thick-walled portion appears remarkably, when being larger than 5.0, and only the thin-walled portion can oscillate even though the amplitude becomes large, whereby it does not appear on the change in the spring constant. The ratio of the wall thickness is preferably within the range of 1.0:1.5–1.0:3.0.

In the flexible portion according to the invention, the wall thickness on a circumference of a concentric circle is formed equally outwardly from the flexible portion, and since the wall thickness in the thin-walled portion is thin, the spring constant is small, moreover, since the wall thickness in the thick-walled portion is thick, the spring constant is large. For the constitution of the wall thickness according to the invention, in the arrangement of the thin-walled portion and the thick-walled portion, any one there of may be arranged on the inner periphery side, moreover, for a manner of the change in the thickness, either of the change which varies successively or in stages, or the change which has the boundary and the thickness is switched.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
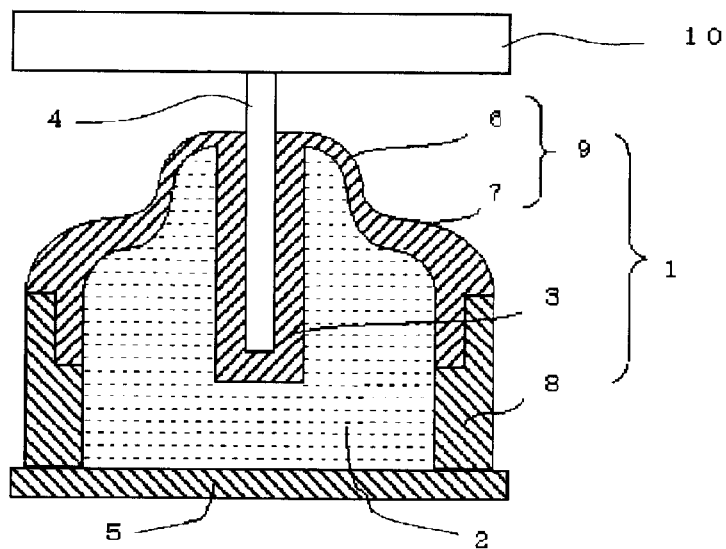
FIG. 1 is a sectional view of a variable spring constant type damper filled with viscous fluid according to the invention.

Hereinafter, the constitution of a variable spring constant type damper filled with viscous fluid according to the invention will be described with reference to the drawings.

The variable spring constant type damper filled with viscous fluid according to the invention a container 1 is constituted by a stirring portion 3, a cylindrical portion 8 and a flexible portion 9 made of elastic body-like rubber connecting both the stirring and cylindrical portions 3, 8. The flexible portion 9 includes a thin-walled portion 6 and a thick-walled portion 7. A viscous fluid 2 is arranged in the container 1 and is sealed with a cap 5, thereby to obtain the variable spring constant type damper filled with viscous fluid. A shaft 4 protrudes from a supported body 10 and is inserted into the stirring portion 3 of the container 1. When an external vibration is generated, the flexible portion 9 is deformed and the stirring portion 3 stirs the visus fluid 2, thereby experiencing a viscous resistance and giving a vibration-isolating effect to the supported body 10. A structure of the cap 5 is formed as a unitized structure in the drawing, but it may be a complex structure.

In the embodiment shown in FIG. 1, a portion of the flexible portion approaching the stirring portion 3 is formed with a thin-walled portion 6. A portion of the flexible portion 9 adjacent the cylindrical portion 8 side is formed with a thick-walled portion 7.

Figure 2:
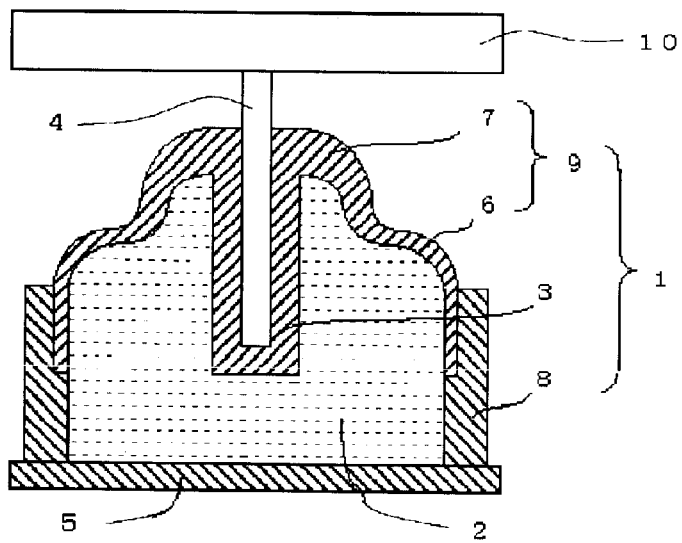
FIG. 2 is a sectional view of a variable spring constant type damper filled with viscous fluid according to the invention.

In contrast with the embodiment shown in FIG. 1, an embodiment shown in FIG. 2, has a portion approaching the stirring portion 3 formed with the thick-walled portion 7, and a portion approaching the cylindrical portion 8 side is formed with the thin-walled portion 6.

Figure 3:
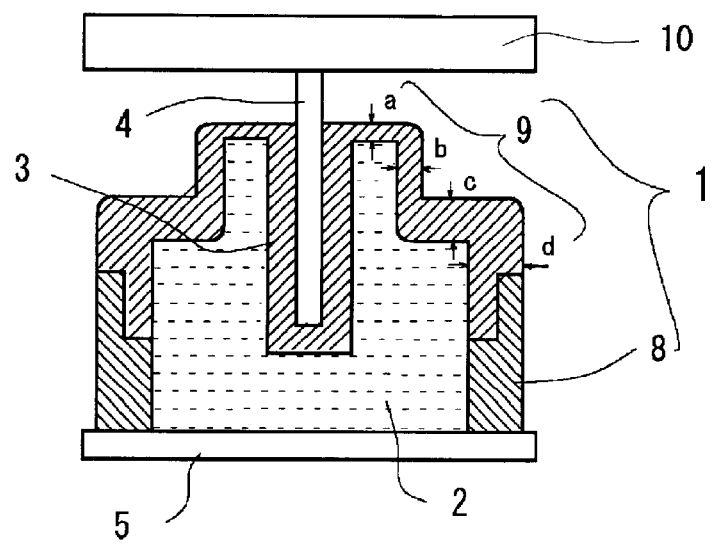
FIG. 3 is a sectional view of a variable spring constant type damper filled with viscous fluid according to the invention.

In an embodiment shown in FIG. 3, a portion of the flexible portion 9 approaching the stirring portion 3 is formed with the thin-walled portion 6 of a wall thickness "a", and other portions are formed in such a manner that a wall thickness "b", "c" and "d" are varied in stages toward the cylindrical portion 8. The wall thicknesses are in the relation of "a"<"b"<"c"<"d".

Figure 4:
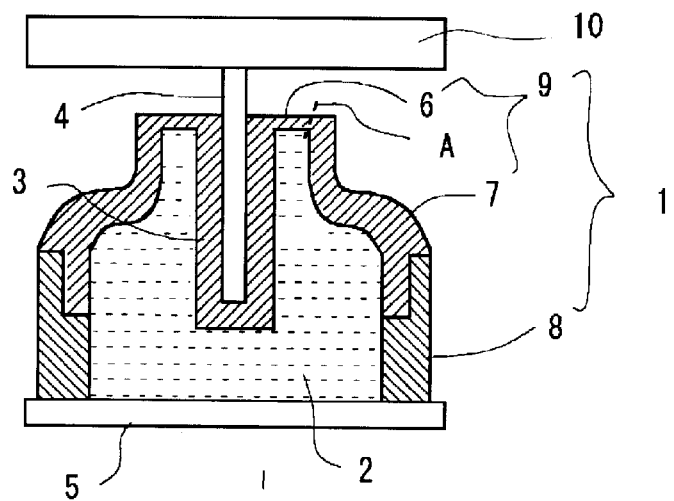
FIG. 4 is a sectional view of a variable spring constant type damper filled with viscous fluid according to the invention.

In an embodiment shown in FIG. 4, the flexible portion 9 has a boundary A and the thin-walled portion 6 adjacent the stirring portion 3 switches to the thick-walled portion 7. The change in the wall thickness is varied in a manner to become continuously thicker toward the cylindrical portion.

Figure 5:
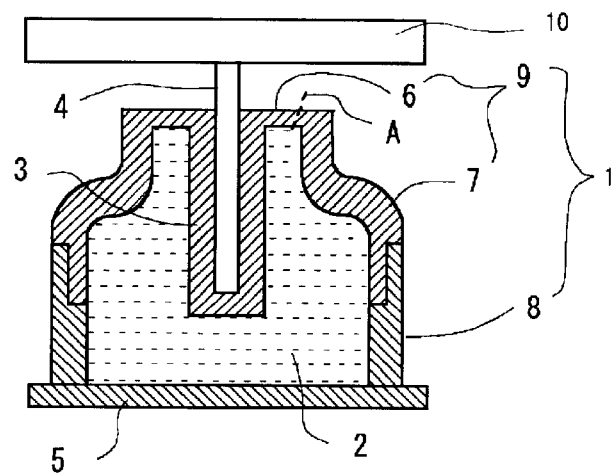
FIG. 5 is a sectional view of a variable spring constant type damper filled with viscous fluid according to the invention.

In an embodiment shown in FIG. 5, the thin-walled portion 6 is formed on a portion approaching the stirring portion 3 and the thick-walled portion 7 is formed in such a manner that at the boundary A, the thickness is switched. The thickness of the thin-walled portion 6 and that of the thick-walled portion 7 do not vary, and are maintained in a constant thickness.

Figure 6:
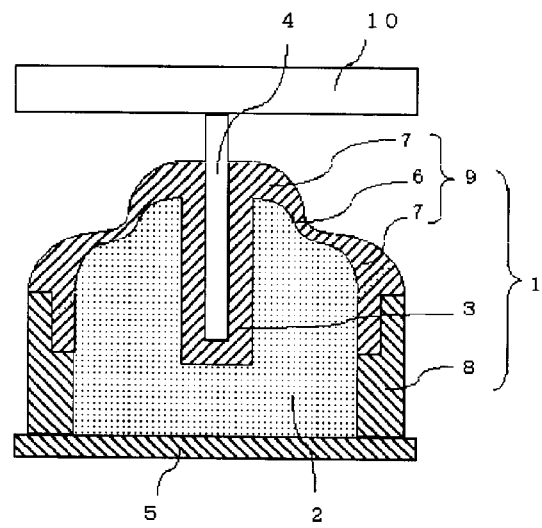
FIG. 6 is a longitudinal sectional view of a variable spring constant type damper filled with viscous fluid according to the invention.

In an embodiment shown in FIG. 6, the thick-walled portion 7 on the flexible portion 9 is formed at the periphery of the connection of the stirring portion 3 and the cylindrical portion 8. The thin-walled portion 6 is formed on an intermediate portion thereof. According to the constitution shown in FIG. 6, vibration durability is improved while suppressing reduction of the vibration isolating effect by thickening the wall thickness in the periphery of the connection between the stirring portion 3.

Figure 7:
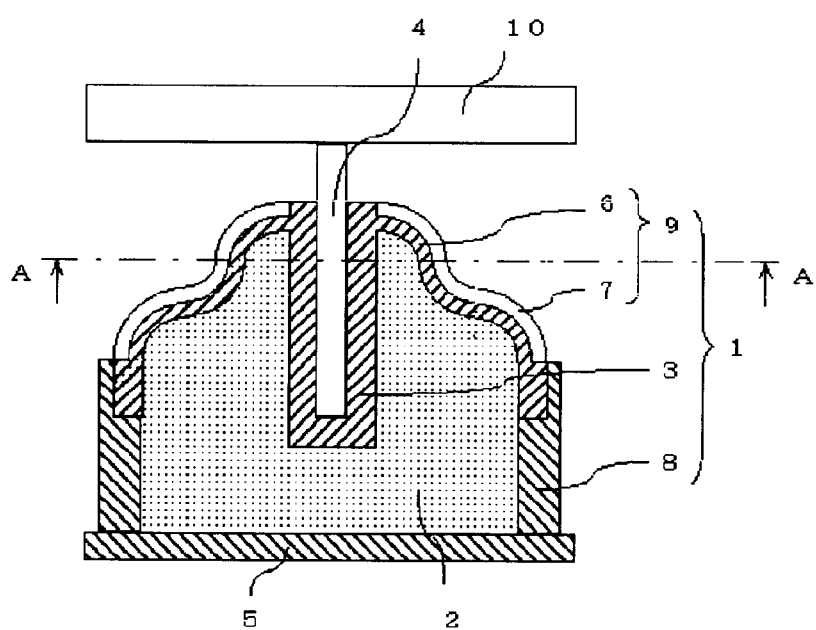
FIG. 7 is a longitudinal sectional view of a variable spring constant type damper filled with viscous fluid according to the invention.
Figure 8:
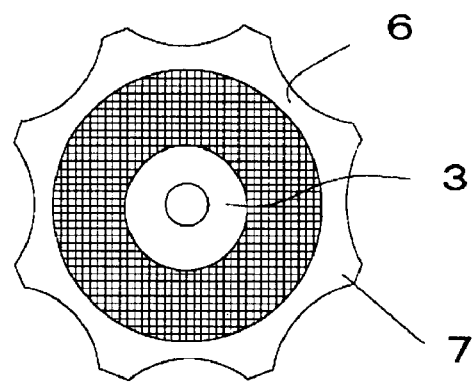
FIG. 8 is a sectional view along line AA in FIG. 7.
Figure 8:
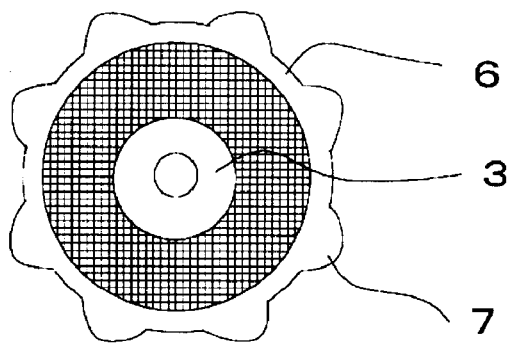
Figure 8:
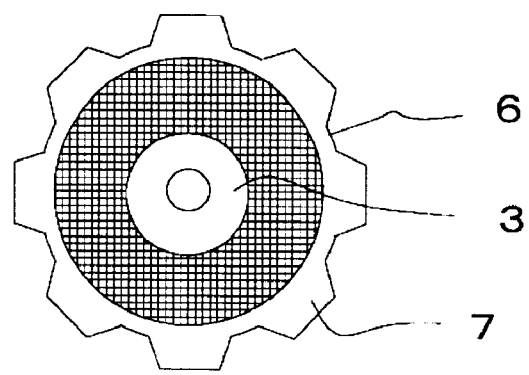

In an embodiment shown in FIG. 7, the thick-walled portion 7 and the thin walled portion 6 of the flexible portion 9 are formed in the circumferential direction and radially alternately. This cross-section shape along line A—A in FIG. 7 which the thick-walled portion 7 and the thin-walled portion 6 in the flexible portion 9 are formed in the circumferential direction radially alternately is shown in FIG. 8(a) to (c). The cross-section shape is not to be limited to the shapes shown in FIG. 8. Moreover, the wall thickness, and the distance and the number of repetitions by which the wall thickness is varied is also not to be limited.

Figure 9:
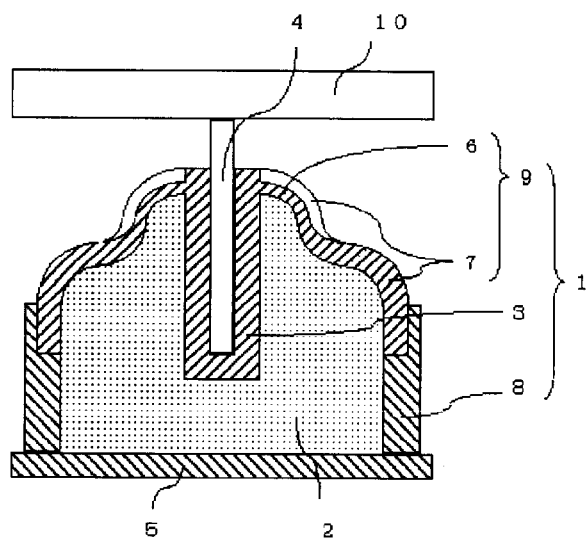
FIG. 9 is a longitudinal sectional view of a variable spring constant type damper-filled with viscous fluid according to the invention.

In an embodiment shown in FIG. 9, the thick-walled portion 7 and the thin walled portion 6 in the flexible portion 9 being alternately formed in the circumferential direction radially is only provided at the periphery of the connection to the stirring portion 3.

Figure 10:
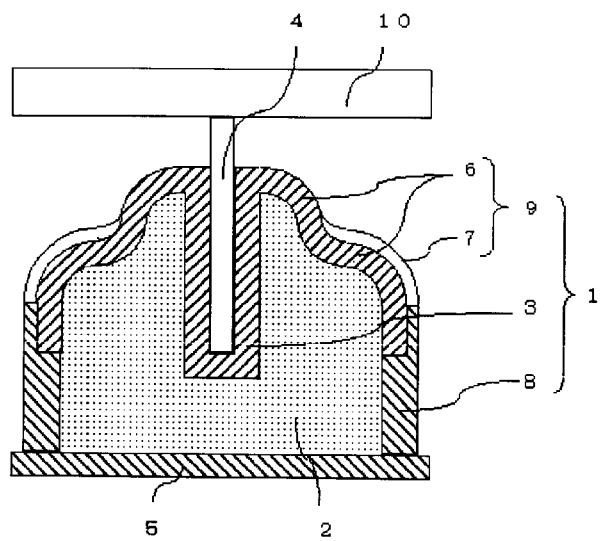
FIG. 10 is a longitudinal sectional view of a variable spring constant type damper filled with viscous fluid according to the invention.

In an embodiment shown in FIG. 10, the periphery of the connection to the stirring portion 3 in the flexible portion 9 is formed with the thin-walled portion 6. The thick-walled portion 7 and the thin-walled portion 6 are formed in the circumferential direction radially alternately adjacent the cylindrical portion 8.

Figure 11:
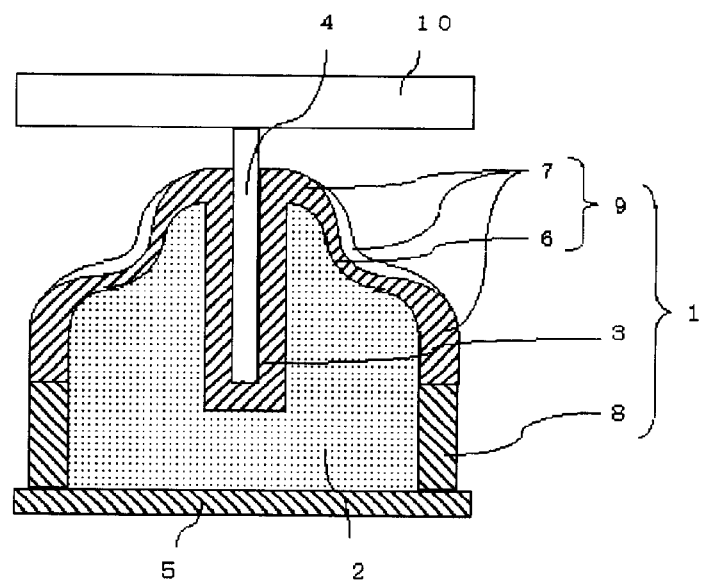
FIG. 11 is a longitudinal sectional view of a variable spring constant type damper filled with viscous fluid according to the invention.
Figure 12:
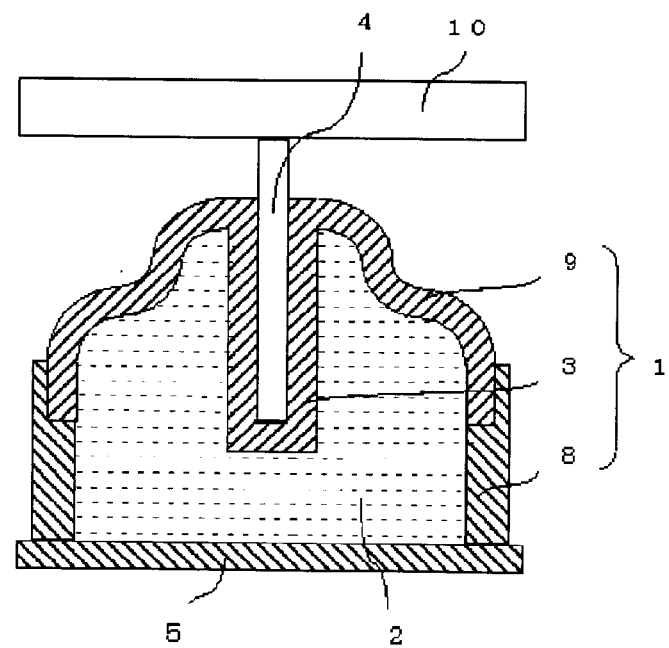
FIG. 12 is a sectional view of a variable spring constant type damper filled with viscous fluid according to the prior art.

In an embodiment shown in FIG. 11, the periphery of the flexible portion 9 adjacent the stirring portion 3 and the cylindrical portion 8 is formed with the thick-walled portion 7. An intermediate portion of the flexible portion 9 includes a thin-walled portion 6 and a thick-walled portion 7 formed in the circumferential direction radially alternately.

In the constitution shown in FIG. 7 to FIG. 11, the flexible portion 9 having the desired spring constant can be obtained more readily than by adjusting the consistent wall thickness by an extremely minuscule amount. This is petformed by correcting the ratio of the thickness of the radial thick-walled portion 7, and the thin-walled portion 6.

Materials used in each member of the invention will be described.

For the cylindrical portion 8 of the invention, materials with rigidity are preferable and rigid resins, metal or the like are given.

For the flexible portion 9 of the invention, the elastic body like rubber is preferable and is selected from the well-known synthetic rubbers, and thermoplastic elastomers. For example, in the synteticr , styrene butadiene rubber, butadiene rubber, chloroprene rubber, nitrile butadiene rubber, butyl rubber, ethylene-propylene rubber, urethane rubber, silicone rubber, fluorine rubber, acrylic rubber or the like are given, and in the thermoplastic elastomers, a styrenesn, a olefin system, an urethane system, an ester system, a vinyl chloride system or the like are given.

When the thermoplastic rigid resin is used in the cylindrical portion and the thermoplastic elastomer is used in the flexible portion, dichroic molding by heat fusion welding becomes possible.

The cap 5 according to the invention may be either of a unitary material of the materials with rigidity or the elastic body like rubber, or a complex material by the combination of the both.

Embodiment 1

The viscous fluid 2 was filled in the container 1 constituted by the flexible portion and the stirring portion 3 made of the elastic body like rubber of the thermoplastic styrene system elastomer of Hardness 30° (JIS K6253 Type A) and the cylindrical portion made of thermoplastic rigid resin. The container 1 was sealed with the cap 5 made by thermoplastic rigid resin, thereby to obtain the variable spring constant type damper filled with viscous fluid. For the viscous fluid 2, silicone grease of the viscosity of 1.2 m'/s, measured by a rotational viscometer, was used. Here, the wall thickness of the thin-walled portion 6 constituting the flexible portion 9 was 0.25 mm, the wall thickness of the thick-walled portion 7 was 0.5 mm, and the thin-walled portion 6 was provided on the periphery of the sting portion 3, furthermore, the thick-wed portion 7 was provided on the outer periphery of the thin-walled portion 6.

Embodiment 2

The wall thickness of the thin-waled portion 6 constituting the flexible portion 9 was 0.25 mm, the wall thickness of the thick-walled portion 7 was 0.38 mm, and the thin-walled portion 6 was provided on the periphery of the stiring portion 3. Furthermore, the thick-walled portion 7 was provided on the outer periphery of the thin-walled portion 6, thereby to obtain the variable spring constant type damper filled with viscous fluid of the embodiment 2 which has the same constitution as the embodiment 1.

Embodiment 3

The wall thickness of the thin-walled portion 6 constituting the flexible portion 9 was 0.25 mm, the wall thickness of the thick-walled portion 7 was 0.75 mm, and the thin-walled portion 6 was provided on the periphery of the stirring portion 3. Furthermore, the thick-walled portion 7 was provided on the outer periphery of the thin-walled portion 6, thereby to obtain the variable spring constant type damper filled with viscous fluid of the embodiment 3 which has the same constitution as the embodiment 1 as a matter of the fact.

Embodiment 4

The wall thickness of the thin-walled portion 6 constitutes the flexible portion 9 was 0.25 mm, the wall thickness of the thick-walled portion 7 was 0.5 mm, and the thick-walled portion 7 was provided on the periphery of the stirring portion 3. Furthermore, the thin-walled portion 6 was provided on the outer periphery of the thick-walled portion 7, thereby to obtain the variable spring constant type damper filled with viscous fluid of the embodiment 4 which has the same constitution as the embodiment 1.

Embodiment 5

The wall thickness of the thin-walled portion 6 constituting the flexible portion 9 was 0.25 mm, the wall thickness of the thick-walled portion 7 was 0.38 mm, and the thick-walled portion 7 was provided on the periphery of the stirring portion 3. Furthermore, the thin-walled portion 6 was provided on the outer periphery of the thick-walled portion 7, thereby to obtain the varible spring constant type damper filled with viscous fluid of the embodiment 5 which has the same constitution as the embodiment 1.

Embodiment 6

The wall thickness of the thin-walled portion 6 constituting the flexible portion 9 was 0.25 mm, the wall thickness of the thick-walled portion 7 was 0.75 mm, and the thick-walled portion 7 was provided on the periphery of the stirring portion 3. Furthermore, the thin-walled portion 6 was provided on the outer periphery of the thick-walled portion 7, thereby to obtain the variable spring constant type damper filled with viscous fluid of the embodiment 6 which has the same constitution as the embodiment 1.

Embodiment 7

The wall thickness of the thin-walled portion 6 constituting the flexible portion 9 was 0.2 mm, the wall thickness of the thick-walled portion 7 was 0.4 mm, and the thick-walled portion 7 was provided on the periphery of the connection adjacent the stirring portion 3 and the cylindrical portion 8, and the thin walled portion 6 was formed on the intermediate portion thereof.

Embodiment 8

The wall thickness of the thick-walled portion 7 was 0.6 mm, and the others were constituted in the same manner as the embodiment 7.

Embodiment 9

The wall thickness of the thick-walled portion 7 was 0.8 mm, and the others were constituted in the same manner as the embodiment 7. Next, the embodiment 10 to 12 will be described with reference to the longitudinal sectional view shown in FIG. 9.

Embodiment 10

For the viscous fluid 2, silicone grease of the viscosity of 1.2 m9/s, measured by the rotational viscometer, was used. Here, the wall thickness of the thin-walled portion 6 constituting the flexible portion 9 was 0.2 mm, the wall thickness of the thick-waled portion was 0.4 mm, and the periphery of the connection between the stirring portion 3 and that was provided with the thin-walled portion 6 and the thick-walled portion 7 in the circumferential direction radially alternately, furthermore, the thick-walled portion 7 was provided up to the cylindrical portion 8 therefrom, and the others were constituted in the same manner as the embodiment 1.

Embodiment 11

The wall thickness of the thick-walled portion 7 was 0.6 mm, and the others were constituted in the same manner as the embodiment 10.

Embodiment 12

The wall thickness of the thick-walled portion 7 was 0.8 mm, and the others were constituted in the same manner as the embodiment 10.

Comparative Example 1

The thickness of the flexible portion 9 was retained in the constant thickness of 0.3 mm. The others were constituted in the same manner as the embodiment 1, thereby to obtain the viscous fluid sealed-type damper of the comparative example 1.

Comparative Example 2

The thickness of the flexible portion 9 was retained in the constant thickness of 0.3 mm. The others were constituted in the same manner as the embodiment 1, thereby to obtain the viscous fluid sealed-type damper of the comparative example 2.

Figure 13:
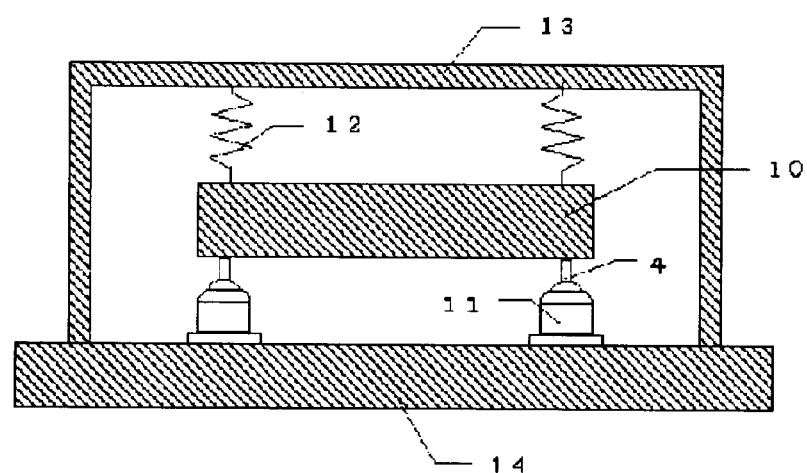
FIG. 13 is a schematic view showing vibration transmission testing equipment.

The vibration-isolating effect of the variable spring constant type damper filled with viscous fluids of the embodiments 1 to 12 and the comparative example 1 and 2 described above will be evaluated by the following examination method and the results will be listed in Table 1. The supported body 10 is supported by protruding the four pieces of shaft 4 of a rigid body from the supported body 10 and to insert these shafts 4 into the four pieces of viscous fluid sealed-type damper 11. The support body 10 is also suspended from a frame with four pieces of helical extension spring, as shown in FIG. 13. This viscous fluid sealed-type damper 11 and the frame 13 are fixed on an excitation table 14.

The vibration-isolating effect was evaluated by vibrating the excitation table 14 upwardly and downwardly at a constant acceleration within the range of 8 to 200 Hz and to measure the vibration transmissibility to the supported body 10. For a resonance magnification, a vibratile acceleration output a2 from the supported body 10 was measured to an incoming a vibrate acceleration a, from the excitation table at the resonance frequency and to convert by a relational expression of 20 Log (a, da1), moreover, the vibration transmissibility at 100 Hz was measured in the same manner.

The wall thickness of the flexible portion 9 in the comparative examples 1 and 2 was constant, whereas, in the embodiments 1 to 12, the reduction of a resonance magnification had been verified under the influence of the increase of the spring constant caused by that the thick-walled portion 7 also was oscillated at the vicinity of the resonance frequency. Moreover, the thin-waled portion 6 was oscillated mairdy at the high-frequency band (the vicinity of 100 Hz) of the vibration-isolating region, whereby the vibration transmissibility equivalent to the comparative examples 1 and 2 was retained therefore, an excellent vibration damping effect had been recognized in the embodiments 1 to 12 as described above.

According to the variable spring constant type damper filled with viscous fluid of the invention, the changes are given to the wall thickness in the flexible portion, thereby to be able to obtain a great damping effect over a wide frequency band from a low frequency band to a high frequency band and to suppress the resonance magnification at the resonance frequency of the supported body. Moreover, the modulus of elasticity can be adjusted while correcting the ratio of the thickness of the thick-walled portion and the thin-walled portion formed on the flexible portion 9 radially, whereby the fine adjustment of the modulus of elasticity has been made possible as compared with the case of adjusting the consistent wall thickness of the flexible portion by an extremely minuscule amount.

Furthermore, vibration durability can be improved while suppressing reduction of the vibration-isolating effect by thickening the wall thickness in the periphery of the stirring portion most largely exerting an influence upon vibration durability, and also in the case of the damper according to the constitution of the type which the flexible portion and the cylindrical portion are secured, and the high-reliability constitution which is large in securing strength between the flexible portion and the cylindrical portion can be obtained whereby the variable spring constant type damper filled with viscous fluid high in vibration durability can be rezed. Furthermore, the effect preventing from causing the sound divergence and the mobs at the vicinity of the resonance frequency in the case of use in the practical instruments can be expected. Moreover, the great damping effect can be shown by the internal flow resistance of the viscous fluid at a high frequency with a small amplitude.

While specific embodiments of the invention have been shown and described in detail to illustrate the application of the principles of the invention, it will be understood that the invention may be embodied otherwise without departing from such principles.

TABLE 1

| | resonance frequency (Hz) | resonance magnification (dB) | vibration transmissibility at 100 Hz (dB) |
|---|---|---|---|
| Example 1 | 15.5 | 2.63 | −17.78 |
| Example 2 | 14.5 | 2.98 | −18.45 |
| Example 3 | 15.5 | 2.13 | −17.66 |
| Example 4 | 15.0 | 2.71 | −17.51 |
| Example 5 | 14.0 | 2.82 | −18.27 |
| Example 6 | 15.5 | 2.36 | −17.14 |
| Example 7 | 15.5 | 3.03 | −19.36 |
| Example 8 | 16.0 | 2.73 | −18.72 |
| Example 9 | 17.0 | 2.49 | −18.29 |
| Example 10 | 16.0 | 2.91 | −18.71 |
| Example 11 | 17.0 | 2.65 | −18.34 |
| Example 12 | 17.5 | 2.36 | −17.68 |
| Comparative 1 | 15.0 | 3.24 | −17.01 |
| Comparative 2 | 16.0 | 3.24 | −17.01 |

What is claimed is:

1. A variable spring constant type damper filled with a viscous fluid in which a container is constituted by a stirring portion having an opening into which a shaft of a supported body is inserted, a cylindrical portion made of a rigid resin or a metal, a flexible portion made of a rubber-like elastic body connecting the opening of the stiring portion for insertion of the shaft and the cylindrical portion, the container being filled with the viscous fluid and sealed with a cap, and the vibration damping is performed with a viscous resistance which is caused by the stirring portion traveling in the viscous fluid in response to a vibration from the external surface of the damper, wherein the flexible portion which is deformed with traveling of the stirring portion is comprised of a thick-walled portion and a thin-walled portion, a ratio of the thickness of the thin-walled portion of the flexible portion to the thickness of the thick-walled portion of the flexible portion is 1.0:1.1 to 1.0:5.0.

2. A variable spring constant type damper filed with a viscous fluid in which the viscous fluid is sealed by a container constituted by a stirring portion having an openings into which a shaft protruded from a supported body is inserted and closely contacting with the shaft, a cylindrical portion made of a rigid resin or a metal, a flexible portion made of a rubber-like elastic body connecting the flexible portion and the cylindrical portion and a cap, and the vibration damping is performed with a viscous resistance which is caused by the stirring portion traveling in the viscous fluid in response to a vibration from the external surface of the damper.

wherein the wall thickness of the flexible portion is formed in such a manner that a thin-walled walled portion and a thick-walled portion are formed repeatedly by turns in the circumferential direction toward the cylindrical portion from the stirring portion in a radial pattern.

3. A damper comprising:
a container, said container defining an opening;
a viscous fluid in said container;
a stirring part arranged in said opening of said container and in said viscous fluid;
a flexible part extending across said opening of said container and connecting said stirring part to said container, said flexible part having a thickness which varies between said container and said stirring part, said thickness varies in a circumferential direction around said stirring part, said thickness alternates repetitively around said stirring part.

4. A damper in accordance with claim 3, wherein:
said flexible part has a deformable portion which is deformable when said stirring part moves relative to said container, said deformable part having said thickness which varies between said container and said stirring part.

5. A damper in accordance with claim 3, wherein:
said thickness varies in a direction from said stirring part to said container.

6. A damper in accordance with claim 3, wherein:
said stirring part has a shape to receive a shaft.

7. A variable spring constant type damper filled with a viscous fluid in which a container is constituted by a stirring portion having an opening into which a shaft of a supported body is inserted, a cylindrical portion made of a rigid resin or a metal, a flexible portion made of a rubber-like elastic body connecting the opening of the stirring portion for insertion of the shaft and the cylindrical portion, the container being filled with the viscous fluid and sealed with a cap, and the vibration damping is performed with a viscous resistance which is causal by the stirring portion traveling in the viscous fluid in response to a vibration from the external surface of the damper, wherein the flexible portion which is deformed with traveling of the stirring portion is comprised of a thick-walled portion and a thin-walled portion,
a change of the wall thickness of the flexible portion are formed so as to vary toward the cylindrical portion from the stirring portion successively or in stages,
a ratio of the thickness of the thin-walled portion of the flexible portion to the thickness of the thick-walled portion of the flexible portion is 1.0:1.1 to 1.0:5.0.

8. A variable spring constant type damper filled with a viscous fluid in which a container is constituted by a stirring portion having an opening into which a shaft of a supported body is inserted, a cylindrical portion made of a rigid resin or a metal, a flexible portion made of a rubber-like elastic body connecting the opening of the stirring portion for insertion of the shaft and the cylindrical portion, the container being filled with the viscous fluid and sealed with a cap, and the vibration damping is performed with a viscous resistance which is caused by the stirring portion traveling in the viscous fluid in response to a vibration from the external surface of the damper, wherein the flexible portion which is deformed with traveling of the stirring portion is comprised of a thick-walled portion and a thin-walled portion,
a wall thickness of the flexible portion is formed to have a boundary toward the cylindrical portion from the stirring portion and to switch the thickness thereof,
a ratio of the thickness of the thin-walled portion of the flexible portion to the thickness of the thick-walled portion of the flexible portion is 1.0:1.1 to 1.0:5,0.

9. A variable spring constant type damper filled with a viscous fluid in which a container is constituted by a stirring portion having an opening into which a shaft of a supported body is inserted, a cylindrical portion made of a rigid resin or a metal, a flexible portion made of a rubber-like elastic body connecting the opening of the stirring portion for insertion of the shaft and the cylindrical portion, the container being filled with the viscous fluid and sealed with a cap, and the vibration damping is performed with a viscous resistance which is causeed by the stirring portion traveling in the viscous fluid in response to a vibration from the external surface of the damper, wherein the flexible portion which is deformed with traveling of the stirring portion is comprised of a thick-walled portion and a thin-walled portion,
a change in wall thickness of the flexible portion is formed so as to become thin toward a central portion there between from the periphery of the connection of the stirring portion and the cylindrical portion successively or in stages,
a ratio of the thickness of the thin-walled portion of the flexible portion to the thickness of the thick-walled portion of the flexible portion is 1.0:1.1 to 1.0:5.0.

10. A variable spring constant type damper filled with a viscous fluid in which a container is constituted by a stirring portion having an opening into which a shaft of a supported body is inserted, a cylindrical portion made of a rigid resin or a metal, a flexible portion made of a rubber-like elastic body connecting the opening of the stirring portion for insertion of the shaft and the cylindrical portion, the container being filled with the viscous fluid and seated with a cap, and the vibration damping is performed with a viscous resistance which is caused by the stirring portion traveling in the viscous fluid in response to a vibration from the external surface of the damper, wherein the flexible portion which is deformed with traveling of the stirring portion is comprised of a thick-walled portion and a thin-wailed portion, a change in wall thickness of the flexible portion is formed so as to become thin toward a central portion there between from the periphery of the connection of the stirring portion and the cylindrical portion successively or in stages, the wall thickness of the flexible portion is formed with a same wall thickness of the peripheral of the connection of the Fog portion and the cylindrical portion, wherein a ratio of thin wall thickness versus the thick wall thickness of the flexible portion is 1.0:1.1 to 1.0:5.0.

* * * * *